US011886881B2

(12) United States Patent
Eyole et al.

(10) Patent No.: US 11,886,881 B2
(45) Date of Patent: Jan. 30, 2024

(54) DECOUPLED ACCESS-EXECUTE PROCESSING AND PREFETCHING CONTROL

(71) Applicant: ARM LIMITED, Cambridge (GB)

(72) Inventors: Mbou Eyole, Cambridge (GB); Michiel Willem Van Tol, Cambridge (GB); Stefanos Kaxiras, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/905,225

(22) PCT Filed: Dec. 21, 2020

(86) PCT No.: PCT/EP2020/087542
§ 371 (c)(1),
(2) Date: Aug. 29, 2022

(87) PCT Pub. No.: WO2021/175481
PCT Pub. Date: Sep. 10, 2021

(65) Prior Publication Data
US 2023/0120783 A1    Apr. 20, 2023

(30) Foreign Application Priority Data
Mar. 3, 2020   (EP) .................................... 20386013

(51) Int. Cl.
*G06F 9/30*     (2018.01)
*G06F 9/38*     (2018.01)

(52) U.S. Cl.
CPC ........ *G06F 9/3802* (2013.01); *G06F 9/30043* (2013.01); *G06F 9/383* (2013.01); *G06F 9/384* (2013.01); *G06F 9/3824* (2013.01)

(58) Field of Classification Search
CPC .... G06F 9/30043; G06F 9/3824; G06F 9/383; G06F 9/3836
See application file for complete search history.

(56) References Cited

U.S. PATENT DOCUMENTS

| | | | |
|---|---|---|---|
| 6,931,639 B1* | 8/2005 | Eickemeyer | G06F 9/3814 |
| | | | 712/228 |
| 2007/0101100 A1* | 5/2007 | Al Sukhni | G06F 9/3808 |
| | | | 712/E9.058 |
| 2008/0022080 A1* | 1/2008 | Craske | G06F 9/3017 |
| | | | 712/225 |

(Continued)

OTHER PUBLICATIONS

Won W Ro, et al., "Design and evaluation of a hierarchical decoupled architecture", The Journal of Supercomputing, Kluwer Academic Publishers, BO, vol. 38, No. 3, Dec. 2, 2006 (Dec. 2, 2006), pp. 237-259, XP019437973,ISSN: 1573-0484, DOI:10.1007/S11227-006-8321-2; abstract; figures 1-17; p. 238, paragraph 4—p. 257, last paragraph.

(Continued)

*Primary Examiner* — Jacob Petranek
(74) *Attorney, Agent, or Firm* — NIXON & VANDERHYE P.C.

(57) ABSTRACT

Apparatuses and methods are provided, relating to the control of data processing in devices which comprise both decoupled access-execute processing circuitry and prefetch circuitry. Control of the access portion of the decoupled access-execute processing circuitry may be dependent on a performance metric of the prefetch circuitry. Alternatively or in addition, control of the prefetch circuitry may be dependent on a performance metric of the access portion.

20 Claims, 7 Drawing Sheets

(56) References Cited

U.S. PATENT DOCUMENTS

| | | | | |
|---|---|---|---|---|
| 2009/0199190 | A1* | 8/2009 | Chen | G06F 9/383 |
| | | | | 718/102 |
| 2010/0274992 | A1* | 10/2010 | Chou | G06F 9/384 |
| | | | | 712/216 |
| 2013/0132680 | A1* | 5/2013 | Peleg | G06F 12/0862 |
| | | | | 711/137 |
| 2015/0143057 | A1* | 5/2015 | Pavlou | G06F 9/383 |
| | | | | 711/137 |
| 2015/0309792 | A1* | 10/2015 | Meier | G06F 9/3834 |
| | | | | 712/225 |
| 2016/0054997 | A1* | 2/2016 | Radhakrishnan | G06F 12/0862 |
| | | | | 711/137 |
| 2016/0321074 | A1* | 11/2016 | Hung | G06F 12/0207 |

OTHER PUBLICATIONS

Chia-Lin Yang, et al., "Tolerating memory latency through push prefetching for pointer-intensive applications", ACM Transactions on Architecture and Code Optimization, Association for Computing Machinery, 2 Penn Plaza, Suite 701 New York NY 10121-0701 USA, vol. 1, No. 4, Dec. 2, 2004 (Dec. 2, 2004), pp. 445-475, XP058186801,ISSN: 1544-3566, DOI:10.1145/1044823.1044827; abstract; figures 1-16; p. 457.

Tanaka H Ed—Lai F, et al., "Toward more advanced usage of instruction level parallelism by a very large data path processor architecture", Parallel Architectures, Algorithms, and Networks, 1997. (I-SPAN '97). Proceedings., Third International Symposium on Taipei, Taiwan Dec. 18-20, 1997, Los Alamitos, CA, USA, IEEE Comput. soc, us, Dec. 18, 1997 (Dec. 18, 1997), pp. 437-443, XP010260420,DOI: 10.1109/ISPAN.1997.645134ISBN: 978-0-8186-8259-9; abstract; figures 1-8; p. 439, right-hand column.

Office Action for EP Application No. 20386013.5 dated Nov. 27, 2023, 8 pages.

Kim-Anh Tran et al., "SWOOP: Software-Hardware Co-design for Non-speculative, Execute-Ahead, In-Order Cores" Association for Computing Machinery, vol. 53, No. 4, Jun. 11, 2018, pp. 328-343.

* cited by examiner

DECOUPLED ACCESS-EXECUTE PROCESSING AND PREFETCHING CONTROL

BACKGROUND

The present technique relates to the field of data processing. More particularly the invention relates to decoupled access-execute processing and prefetching.

A data processing apparatus may be arranged according to the decoupled access-execute (DAE) paradigm, according to which load-related instructions are handled by an access portion of the apparatus, whilst a separate execute portion of the apparatus handles all other instructions. The decoupling of these access and execute phases enables the access phase to typically be run ahead of the execute phase in order to bring data from memory into the core in advance of the time point at which that data is required for the performance of data processing instructions. The aim of the DAE paradigm is that the execution units (of the execute portion) have a steady supply of data on which to operate, thus improving the processor's instruction schedule, increasing opportunities for memory-level parallelism, and reducing the likelihood of cache misses. A data processing apparatus may also be provided with a prefetcher, which observes the patterns of memory addresses from which data items are retrieved by the processor in the course of its data processing and proactively causes predicted memory addresses to be accessed and the corresponding data to be brought into cache levels of the apparatus. This technique also seeks to reduce the likelihood of cache misses and improve the throughput of the data processing apparatus.

SUMMARY

In one example arrangement, there is provided an apparatus comprising: instruction fetch circuitry to retrieve a sequence of instructions; instruction processing circuitry comprising decoupled access-execute processing circuitry comprising an access portion and an execute portion, wherein the access portion is arranged to execute load-related instructions of the sequence of instructions and to cause data items to be retrieved from memory as a result of the load-related instructions to be locally stored for access by the execute portion, and the execute portion is arranged to execute data processing instructions of the sequence of instructions comprising accessing locally stored operands of the data processing instructions; and memory access circuitry comprising: a data cache for temporary storage of data items retrieved from memory by the instruction processing circuitry; prefetch circuitry responsive to an identified pattern of data retrieval by the instruction processing circuitry to extrapolate the identified pattern and cause data items from predicted addresses to be retrieved from memory and stored in the data cache based on the extrapolated pattern, wherein the apparatus is arranged to carry out at least one of: control of the access portion in dependence on a performance metric of the prefetch circuitry; and control of the prefetch circuitry in dependence on a performance metric of the access portion.

In one example arrangement there is provided a method of data processing comprising: retrieving a sequence of instructions for execution by decoupled access-execute processing circuitry comprising an access portion, an execute portion, and a decoupled access buffer; executing load-related instructions of the sequence of instructions in the access portion; storing data items retrieved from memory as a result of the load-related instructions in the decoupled access buffer; executing data processing instructions of the sequence of instructions in the execute portion comprising accessing operands of the data processing instructions stored in the decoupled access buffer; storing data items retrieved from memory in a data cache; using prefetch circuitry to identify a pattern of data retrieval from memory and to extrapolate the identified pattern; using the prefetch circuitry to retrieve data items from predicted addresses in memory and stored in the data cache based on the extrapolated pattern; and carrying out at least one of: control of the access portion in dependence on a performance metric of the prefetch circuitry; and control of the prefetch circuitry in dependence on a performance metric of the access portion.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

In some example embodiments there is an apparatus comprising: instruction fetch circuitry to retrieve a sequence of instructions; instruction processing circuitry comprising decoupled access-execute processing circuitry comprising an access portion and an execute portion, wherein the access portion is arranged to execute load-related instructions of the sequence of instructions and to cause data items to be retrieved from memory as a result of the load-related instructions to be locally stored for access by the execute portion, and the execute portion is arranged to execute data processing instructions of the sequence of instructions comprising accessing locally stored operands of the data processing instructions; and memory access circuitry comprising: a data cache for temporary storage of data items retrieved from memory by the instruction processing circuitry; prefetch circuitry responsive to an identified pattern of data retrieval by the instruction processing circuitry to extrapolate the identified pattern and cause data items from predicted addresses to be retrieved from memory and stored in the data cache based on the extrapolated pattern, wherein the apparatus is arranged to carry out at least one of: control of the access portion in dependence on a performance metric of the prefetch circuitry; and control of the prefetch circuitry in dependence on a performance metric of the access portion.

The present techniques recognise that the decoupled access-execute (DAE) processing paradigm and the techniques of prefetching both can support a more efficient operation of a data processing apparatus by each (when working well) providing the execution units of the data processing apparatus with the data items retrieved from memory specified by those instructions (shortly) in advance of when those data items are required, such that generally the execution units are not stalled, waiting for the retrieval of required data items from memory to complete. Further, the present techniques also recognise that whilst these two techniques (DAE processing and prefetching) may generally be seen as alternative methods for achieving a similar aim, situations may arise in which the provision of support for both techniques in a data processing apparatus is beneficial and moreover that the two techniques may in certain circumstances be complementary to one another, wherein situations arise in which one may work better than the other and vice versa. Accordingly, the present techniques provide that the control of the access portion of the DAE processing circuitry of the apparatus can be controlled at least in part in dependence on the operation of the prefetch circuitry. Conversely the prefetch circuitry may be controlled at least in part in dependence on the operation of the access portion of the DAE processing circuitry. More particularly, in each case a performance metric may be defined in order to support that dependent control. This linking of the operation of the access portion and the prefetch circuitry, such that at least one is dependent on the operation of the other, provides a more adaptable data processing apparatus which can respond to changing operating conditions.

In some embodiments the instruction processing circuitry further comprises a decoupled access buffer and the access portion is arranged to cause the data items retrieved from memory as a result of the load-related instructions to be stored in the decoupled access buffer, and the execute portion is arranged to execute the data processing instructions of the sequence of instructions comprising accessing the operands of the data processing instructions stored in the decoupled access buffer. It will be understood therefore that the decoupled access buffer is distinct from, and different to, cache memory storage of the apparatus, since the decoupled access buffer refers to a storage area in close proximity to the processing circuitry, which only contains data items directly accessed by the program being executed by the processing circuitry, whilst a cache memory storage area would contain data items retrieved probabilistically based on temporal and spatial locality.

Advantageously there are a great variety of ways in which the control of the access portion may be made dependent on the performance metric of the prefetch circuitry and conversely also a great variety of ways in which the control of prefetch circuitry may be made dependent on the performance metric of the access portion.

In some embodiments the apparatus is responsive to the performance metric of the prefetching circuitry meeting a prefetching accuracy threshold to reduce an extent to which the access portion executes the load-related instructions of the sequence of instructions in advance of the execute portion executing the data processing instructions of the sequence of instructions. When the prefetching circuitry meets (i.e. reaches or exceeds) the defined prefetching accuracy threshold, this means that the prefetching circuitry is currently being successful at predicting the data access patterns of the apparatus and hence this opportunity can be taken to reduce the extent to which the access portion runs ahead of the execute portion of the DAE processing circuitry. This may for example have benefits in terms of reducing the energy consumption of the processing circuitry within the processor, in cases where running the access portion ahead of the execute portion generally consumes more power than operation of the prefetching circuitry (at an appropriate aggressiveness/distance).

Conversely in some embodiments the apparatus is responsive to the performance metric of the prefetching circuitry not meeting a prefetching accuracy threshold to increase an extent to which the access portion executes the load-related instructions of the sequence of instructions in advance of the execute portion executing the data processing instructions of the sequence of instructions. Thus conversely when the prefetching circuitry is being less successful at predicting the data access patterns of the data processing being carried out, the access portion of the DAE processing circuitry can be allowed to run further ahead of the execute portion, in order to regain some advantage of the DAE paradigm type of advance data retrieval, when the data access patterns are harder to predict (and therefore to prefetch).

Equally a similar approach may be taken to the control of the prefetch circuitry based on the operation of the access portion. Accordingly in some embodiments the apparatus is responsive to the performance metric of the access portion meeting a decoupled access-execute processing performance threshold to reduce an extent to which the prefetch circuitry causes data items to be retrieved from memory and stored in the data cache based on the extrapolated pattern. Thus when the decoupled access-execute paradigm being implemented in the apparatus is working relatively successfully, the prefetcher's aggressiveness and distance can be reduced. This may also reduce any negative effect on cache occupancy or on another processor's memory bandwidth attributable to the prefetcher operation.

Conversely when the decoupled access execute paradigm is currently less successful the prefetcher can be made more aggressive and have its distance increased to compensate accordingly. Accordingly, in some embodiments the apparatus is responsive to the performance metric of the access portion not meeting a decoupled access-execute processing performance threshold to increase an extent to which the prefetch circuitry causes data items to be retrieved from memory and stored in the data cache based on the extrapolated pattern.

With respect to the access portion, the performance metric may be defined in a variety of ways. For example, in some embodiments the performance metric of the access portion comprises a current occupancy of the decoupled access buffer and the decoupled access-execute processing performance threshold comprises a defined occupancy level of the decoupled access buffer. Thus the occupancy level of the decoupled access buffer may be used as an indication of how well the DAE operation is running, in particular the extent to which the advance retrieval of data items by the access portion into the decoupled access buffer for access by the execute portion is currently succeeding.

Other aspects of the typically pipelined configuration of the processing circuitry may also be made use of to define the performance metric of the access portion and in some embodiments the apparatus further comprises an issue stage comprising at least one delay counter, wherein each delay counter is arranged to measure a period for which a data processing instruction of the sequence of instructions is held at the issue stage pending its operands being available in the decoupled access buffer, and wherein the performance metric of the access portion comprises the period or periods measured by the at least one delay counter. Accordingly, where delays at the issue stage (because required operands are not available) can be indicative of the relative success of the access portion to provide operands for the execute portion, such a delay counter or delay counters can provide a useful performance metric for the access portion.

The control of the access portion may also be implemented in a variety of ways. For example, in some embodiments the apparatus further comprises register renaming circuitry to perform register renaming operations to support out-of-order execution of the load-related instructions of the sequence of instructions by the access portion, and wherein the apparatus is arranged to carry out the control of the access portion by modification of a number of access registers which can be renamed by the register renaming operations. This provides a mechanism by which the degree of decoupling (i.e. how far the access portion can run ahead of the execute portion) can be controlled. When the number of access registers that can be renamed is limited this can stall the rename stage, in turn reducing the degree to which the access portion can run ahead of the execute portion.

In some embodiments the apparatus is arranged to carry out the control of the access portion by modification of a maximum usable capacity of the decoupled access buffer. Therefore this also provides a mechanism by which the degree to which the access portion can run ahead of the execute portion can be limited.

In some embodiments the apparatus is arranged to carry out the control of the access portion by modification of an issue rate at which the load-related instructions of the sequence of instructions are dispatched for execution by the access portion. This also provides a mechanism by which the rate at which the access portion can execute instructions can be directly controlled, and therefore the extent to which it can run ahead of the execute portion (i.e. the degree of decoupling) is controlled.

In some embodiments the apparatus is arranged to carry out the at least one of: the control of the access portion in dependence on a performance metric of the prefetch circuitry; and control of the prefetch circuitry in dependence on a performance metric of the access portion, subject to a hysteresis function applied to the performance metric. Accordingly a hysteresis function may be applied to either or both of the performance metrics of the prefetch circuitry and the access portion. This may enable improved control of either or both of the prefetch circuitry and the access portion, by delaying the implementation of a given control mechanism in response to predefined threshold values of the respective performance metric. In particular, when the apparatus is operating such that either or both of the performance metrics are fluctuating close to a predetermined threshold at which a change in the control of either or both of the access portion and the prefetch circuitry is to be carried out, the hysteresis function enables a more stable operation to be supported, by ensuring that short term fluctuations in the performance metric are either ignored or at least only acted on after a delay.

The apparatus may also be arranged to be responsive to indications from a memory system and/or an interconnect that congestion is arising to modify either or both of the operation of the access portion and the operation of the prefetch circuitry. For example in some embodiments the memory access circuitry is arranged to receive an access congestion indication from a memory system and/or an interconnect, and the apparatus is responsive to receipt of the congestion indication to reduce an extent to which the access portion executes the load-related instructions of the sequence of instructions in advance of the execute portion executing the data processing instructions of the sequence of instructions. For example, such an indication may take the form of a "negative acknowledgement" (NACK). Similarly in some embodiments the apparatus is further responsive to the receipt of the congestion indication to reduce an extent to which the prefetch circuitry causes data items to be retrieved from memory and stored in the data cache based on the extrapolated pattern. In other words, the prefetch aggressiveness and distance can be reduced when such a congestion indication is received.

The apparatus may also be arranged to issue follow-up signals relating to memory access requests which have already been issued. For example, in some embodiments the apparatus is responsive to the performance metric of the access portion meeting a decoupled access-execute processing performance threshold to cause the memory access circuitry to issue a control signal to cause at least one prefetch request already issued by the prefetch circuitry to be lowered in priority and/or abandoned. Thus pending prefetch requests can be lowered in priority or indeed abandoned entirely when the access portion is operating successfully to the extent that prefetching is less needed.

Similarly, the apparatus may be responsive to the prefetching operations being successful to modify the access portion related memory accesses and in some embodiments the apparatus is responsive to the performance metric of the prefetching circuitry meeting a prefetching accuracy threshold to cause the memory access circuitry to issue a control signal to cause at least one access request issued by the access portion to retrieve at least one data item from memory to be lowered in priority. Note however that where the memory access requests issued by the access portion form part of the program instructions (and therefore are certain to be needed, unlike prefetch requests), it may be chosen only to lower them in priority (and not kill them entirely).

However, such memory access requests may also be caused to be abandoned, in order to gain the short term benefit of decreasing congestion, but then will need to be reissued in order to correctly carry out the sequence of instructions defined by the program. Accordingly, in some embodiments the apparatus is responsive to the performance metric of the prefetching circuitry meeting a prefetching accuracy threshold to cause the memory access circuitry to issue a control signal to cause at least one access request issued by the access portion to retrieve at least one data item from memory to be abandoned and to issue a retry signal to the access portion to cause the access portion to re-issue the at least one access request. Note that the access portion could immediately reissue the at least one access request in response to the retry signal or it might be further delayed until a later time, depending on the current operation of the access portion and the degree of decoupling which is currently implemented.

At least some example embodiments described herein comprise multiple apparatuses configured as any of the embodiments described above, linked together to form a data processing system. Accordingly, in some embodiments the system comprises plural apparatuses as described above, wherein the system is responsive to receipt of the congestion indication to coordinate the control of the access portion and/or the control of the prefetch circuitry of each apparatus in dependence on at least one of: a system fairness rule; and a quality-of-service metric for at least one of the plural apparatuses. More balanced performance across the plural apparatuses of the system can therefore be achieved, by modification of the control of the access portion and/or the control of the prefetch portion of each apparatus.

Further, in some such embodiments the system is responsive to the performance metric of the access portion meeting a decoupled access-execute processing performance threshold to cause the memory access circuitry to issue a control signal to cause at least one prefetch request already issued by the prefetch circuitry to be lowered in priority and/or abandoned. Thus, prefetch requests issued by one apparatus may be lowered in priority and/or abandoned when a congestion indication is received, in order to free up system bandwidth to the benefit of another apparatus.

At least some embodiments described herein provide a method of data processing comprising: retrieving a sequence of instructions for execution by decoupled access-execute processing circuitry comprising an access portion, an execute portion, and a decoupled access buffer; executing load-related instructions of the sequence of instructions in the access portion; storing data items retrieved from memory as a result of the load-related instructions in the decoupled access buffer; executing data processing instructions of the sequence of instructions in the execute portion comprising accessing operands of the data processing instructions stored in the decoupled access buffer; storing data items retrieved from memory in a data cache; using prefetch circuitry to identify a pattern of data retrieval from memory and to extrapolate the identified pattern; using the prefetch circuitry to retrieve data items from predicted addresses in memory and stored in the data cache based on the extrapolated pattern; and carrying out at least one of: control of the access portion in dependence on a performance metric of the prefetch circuitry; and control of the prefetch circuitry in dependence on a performance metric of the access portion.

Some specific implementations will now be described with respect to the figures.

Figure 1:
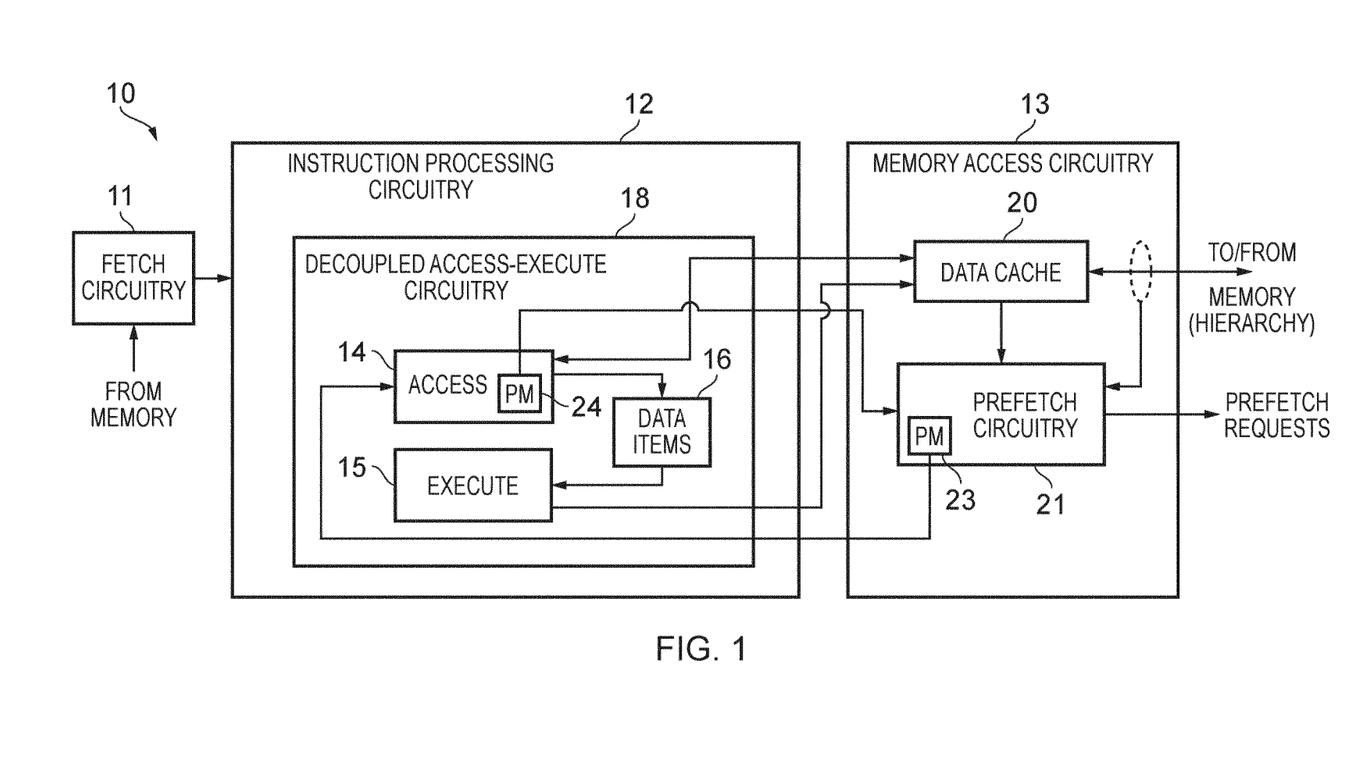
FIG. 1 schematically illustrates an apparatus in some example embodiments.

FIG. 1 schematically illustrates a data processing apparatus 10 in some example embodiments. Generally the apparatus can be seen to comprise fetch circuitry 11, instruction processing circuitry 12, and memory access circuitry 13. The fetch circuitry 11 is arranged to cause a sequence of instructions to be retrieved from memory, which are then provided to the instruction processing circuitry 12 for execution. The instruction processing circuitry 12 is arranged according to the decoupled access-execute paradigm, and thus decoupled access-execute circuitry 18 comprises two separate and distinct parts, namely the "access" portion and the "execute" portion. Instructions received by the instruction processing circuitry 12 are identified as either being categorised as "access" instructions, which are then allocated to the access portion 14 for execution or otherwise are determined to be "execute" instructions which are then allocated to the "execute" portion 15 for execution. "Access" instructions are those instructions in the sequence of instructions retrieved by the fetch circuitry 12 and provided to the instruction processing circuitry 12, which are "load-related". The term "load-related instructions" is to be understood here to mean load instructions themselves and any other instructions which provide (directly or indirectly) operands for load instructions. In accordance with the decoupled access-execute paradigm, the access portion 14 is arranged to execute the "access" instructions out-of-order, with respect to the other ("execute") instructions executed by the "execute" portion, in particular aiming to do so such that these instructions are executed sufficiently far in advance that the load operations that they relate to have time to complete, i.e. to bring relevant data items from the memory system into the instruction processing circuitry 12 before those data items are required for the execution of the "execute" instructions executed by the "execute" portion 15. Thus, these data items which are caused to be retrieved by the access portion 14 are stored in the local storage 16 within the decoupled access execute circuitry 18, such that they can then be provided to the execute portion 15 as required. This local storage 16 could be variously provided, such as in the form of physical registers, as a decoupled access buffer, or any other such internal storage.

The data processing apparatus 10 also comprises the memory access circuitry 13, which comprises data cache 20 and prefetch circuitry 21. In a manner with which one of ordinary skill in the art will be familiar, the prefetch circuitry 21 is arranged to monitor the memory accesses handled by the memory access circuitry and in particular the requests issued from the data cache 20 to the further levels of the memory hierarchy, in order to seek to determine patterns therein, and on this basis to generate prefetch requests for the memory system in order to seek to pre-populate the data cache 20 with data items which it is expected will be required by future data processing operations (i.e. by future memory access requests generated by future data processing instructions). It is to be noted that the prefetch circuitry 21 comprises a performance monitor (PM) 23 and the access portion 14 of the decoupled access-execution circuitry 18 comprises a performance monitor (PM) 24. Each of these is arranged to generate a respective performance metric indicative of the current performance of the prefetch circuitry 21 and the access portion 14. Note in particular that the performance metric generated by PM 23 of the prefetch circuitry 21 is provided to the access portion 14, whilst the performance metric generated by the PM 24 of the access portion 14 is provided to the prefetch circuitry 21. According to this arrangement the manner in which the access portion 14 operates can be made dependent on the performance of the prefetch circuitry 21 and conversely the manner in which the prefetch circuitry 21 operates can be made dependent on the performance of access portion 14. Further, it should be noted that although the example embodiment schematically illustrated in FIG. 1 shows a symmetric arrangement (i.e. where the access portion 14 and the prefetch circuitry 21 are each arranged to receive the other's performance metrics), this is not essential and embodiments are envisaged in which only one of these components provides its performance metric to the other. The control of the access portion 14 and the control of the prefetch circuitry 21 may be implemented in various ways, but generally speaking the "aggressiveness" of the operation of each may be varied in dependence on the performance of the other. For example, under circumstances in which the prefetch circuitry 21 is currently successfully predicting the data patterns of the memory accesses it observes and the prefetch accuracy is high, then the "degree of decoupling" implemented by the decoupled access-execute circuitry 18 may be reduced. That is to say, the extent to which the decoupled access execute circuitry allows the access portion to run ahead of the execute portion (in terms of "early" execution of access instructions). This may for example enable the energy usage of the instruction processing circuitry to be reduced. Conversely, under circumstances in which the data patterns of the memory accesses are harder to prefetch and the prefetch accuracy is low, then this lower performance of the prefetch circuitry can cause the access portion 14 to increase the degree to which the access phase is run ahead of the execute phase, in order to seek to take advantage of the performance benefits of the decoupled access-execute paradigm. Viewed from the point of the view of the performance of the decoupled access-execute circuitry 18, the performance metric generated by PM 24 in the access portion 14 may indicate that the decoupling is currently successful and the lead of the access phase over the execute phase is allowing the execute phase to perform its operations without delay. Under these circumstances the need for prefetching is reduced and thus the prefetcher's aggressiveness and/or distance can be reduced.

Figure 2A:
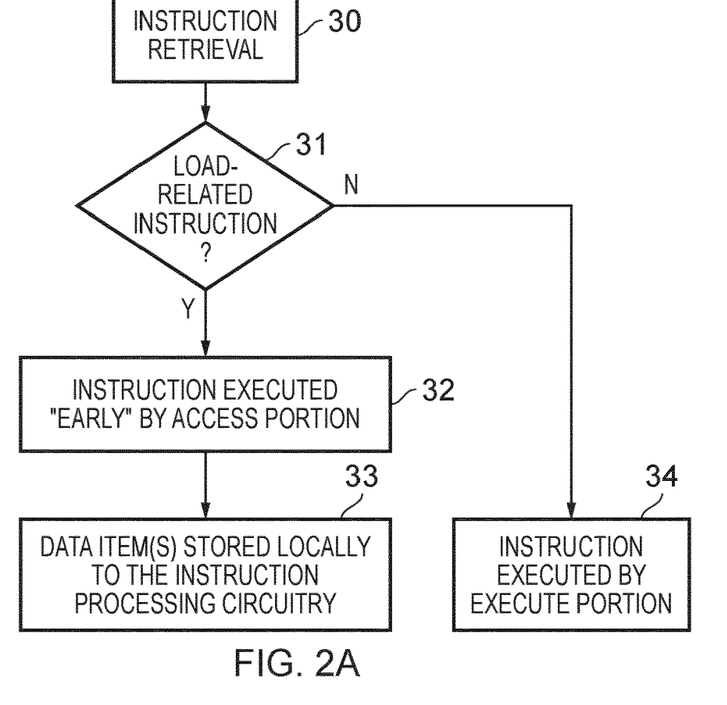
FIG. 2A is a flow diagram showing a set of steps which are taken according to the present techniques in some embodiments.
Figure 2B:
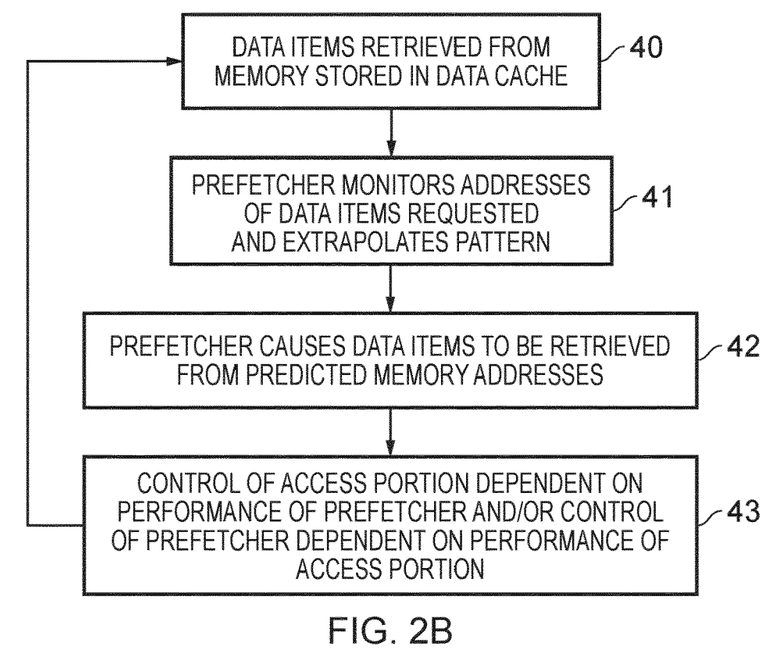
FIG. 2B is a flow diagram showing a set of steps which are taken according to the present techniques in some embodiments.

FIGS. 2A and 2B are flow diagrams illustrating sequence of steps which are taken when operating an apparatus such as that shown in FIG. 1. FIG. 2A relates to the process by which an instruction retrieved by the fetch circuitry for execution by instruction processing circuitry is allocated to either the access portion or to the execute portion. The flow begins at step 30, where instruction retrieval takes place and the next instruction in the sequence of instructions is provided. It is determined at step 31 whether this is a load-related instruction. This determination of the type of instruction may for example be on the basis of a pre-labelling of the instructions according to type. It may also be on the basis of an on-line identification of the type, as is for example described in U.S. patent application Ser. No. 16/658,490 and in European patent application 19386043.4. If the instruction is determined at step 31 to be load-related, then the instruction is to be executed by the access portion of the decoupled access-execute circuitry, in particular being executed "early" according to the decoupled access/execute paradigm, whereby the access phase is run ahead of the execute phase to enable data items which are the subject of load instructions to be retrieved from memory in advance of being needed for other data processing operations. Thus, at step 33, as a result data items which are caused (directly or indirectly) to be retrieved from memory by the instruction are stored locally to the instruction processing circuitry, for example in physical registers, decoupled access buffers or other such internal storage areas. Returning to a consideration of step 31, if it is determined that the instruction under consideration is not a load-related instruction, then the flow proceeds to step 34 and the instruction is executed by the execute portion of the decoupled access-execute circuitry.

FIG. 2B is a sequence of steps which shows the general manner in which an apparatus embodying the present techniques, such as apparatus 10 schematically shown in FIG. 1, may operate. The flow can be considered to begin at step 40, where in the course of the data processing operation carried out data items are caused to be retrieved from memory and are stored in a data cache (for example in data cache 20 of the memory access circuitry 13 in the example of FIG. 1). Then, step 41 shows a prefetcher monitoring the addresses of the data items requested and extrapolating the pattern of these addresses. On the basis of the extrapolated pattern, at step 42, the prefetcher causes further data items to be retrieved from predicted memory addresses (by means of prefetch requests). Finally step 43 shows the control of the access portion of decoupled access-execute circuitry being dependent on the performance of the prefetcher and/or control of the prefetcher being dependent on the performance of the access portion. The flow then returns to step 40.

Figure 3A:
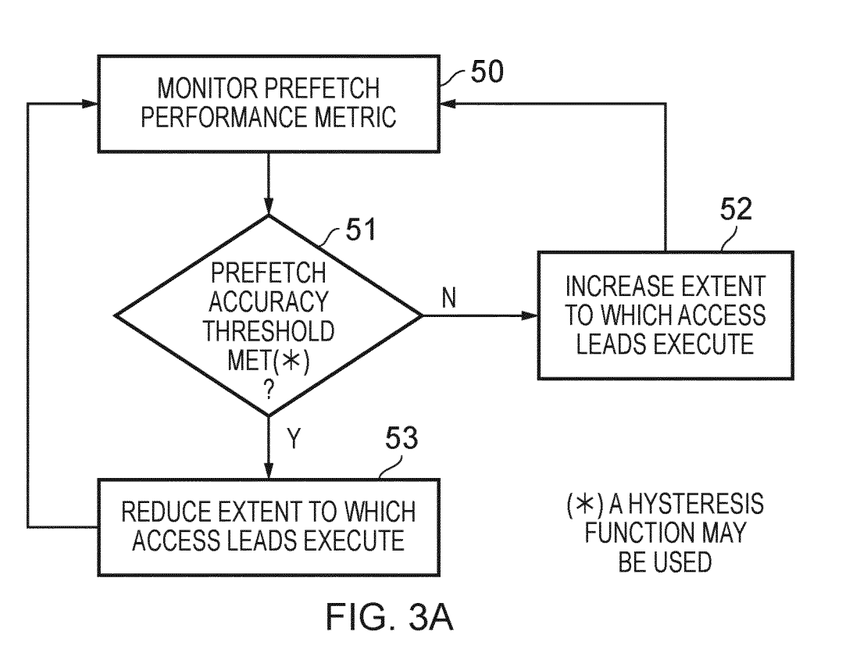
FIG. 3A is a flow diagram showing a set of steps which are taken according to the present techniques in some embodiments.
Figure 3B:
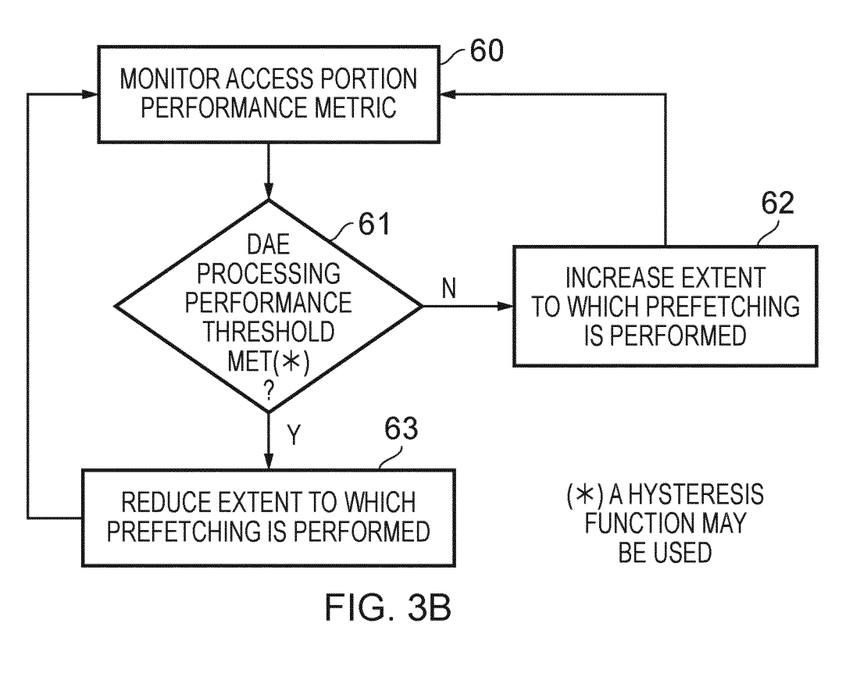
FIG. 3B is a flow diagram showing a set of steps which are taken according to the present techniques in some embodiments.

FIGS. 3A and 3B are flow diagrams showing examples of how the control of prefetch circuitry and the control of the access portion of decoupled access-execute circuitry may be carried out. FIG. 3A relates to the control of the access portion of the decoupled access-execute processing circuitry. The flow can be considered to begin at step 50 where a performance metric relating to the prefetching being performed by the apparatus is monitored. At step 51 it is determined if a prefetch accuracy threshold is currently being met. For example the performance metric relating to the prefetching may have a certain numerical value and this may be compared to a predetermined threshold value, wherein performance metric values at or above the predetermined threshold value are interpreted as the prefetch accuracy threshold being met and performance metric values below the predetermined threshold value are interpreted as the prefetch accuracy threshold not being met. If the prefetch accuracy threshold is not met, then the flow proceeds to step 52 at which the extent to which the access portion leads the execute portion (i.e. the access phase runs ahead of the execute phase) is increased and the flow returns to step 50. Alternatively at step 51 if it is determined that the prefetch accuracy threshold is currently being met, then the flow proceeds to step 53 at which the extent to which the access portion leads the execute portion (i.e. the access phase runs ahead of the execute phase) can be reduced. The flow then returns to step 50. Note that the figure indicates that a hysteresis function may be used with respect to the threshold at step 51. This may be employed to provide a more stable control of the decoupled access-execute processing on the basis of the prefetching accuracy. Without such hysteresis being involved, each loop around the flow steps of FIG. 3A will result in a modification (either an increase or a decrease) of the extent to which the access phase leads the execute phase. The use of hysteresis can be implemented for example so that there is in effect not just a single threshold above which the prefetch accuracy causes a reduction in the lead of the access phase and below which causes an increase in the lead of the access phase, but instead the prefetch accuracy threshold must be exceeded for a given period of time or by a predetermined amount before the relevant change is triggered.

Conversely, FIG. 3B shows an manner in which the control over the prefetch circuitry may be performed. The flow can be considered to being at step 60 where a performance metric relating to the access portion (generally, a DAE performance metric) is monitored. It is then determined at step 61 if a decoupled access execute (DAE) performance threshold is met. As in the case of FIG. 3A, the performance metric relating to the DAE processing may have a certain numerical value and this may be compared to a predetermined threshold value, wherein performance metric values at or above the predetermined threshold value are interpreted as the DAE performance threshold being met and performance metric values below the predetermined threshold value are interpreted as the DAE performance threshold not being met. If the DAE performance threshold is not met then the flow proceeds to step 62 where an extent to which prefetching is performed may be increased (for example the prefetch aggressiveness and/or distance may be increased). Thereafter the flow returns to step 60. Alternatively at step 61 if the DAE performance threshold is met, then the flow proceeds to step 63 where the extent to which prefetching is performed may be reduced (for example the prefetch aggressiveness and/or distance may be decreased). Note that FIG. 3B also indicates that at step 61 a hysteresis function may be used in order to support a more stable regulation of the prefetching. As in the case of FIG. 3A this hysteresis can be implemented for example so that there is in effect not just a single threshold above which the DAE performance causes a reduction in the prefetching and below which causes an increase in the prefetching, but instead the DAE performance threshold must be exceeded for a given period of time or by a predetermined amount before the relevant change is triggered.

Figure 4:
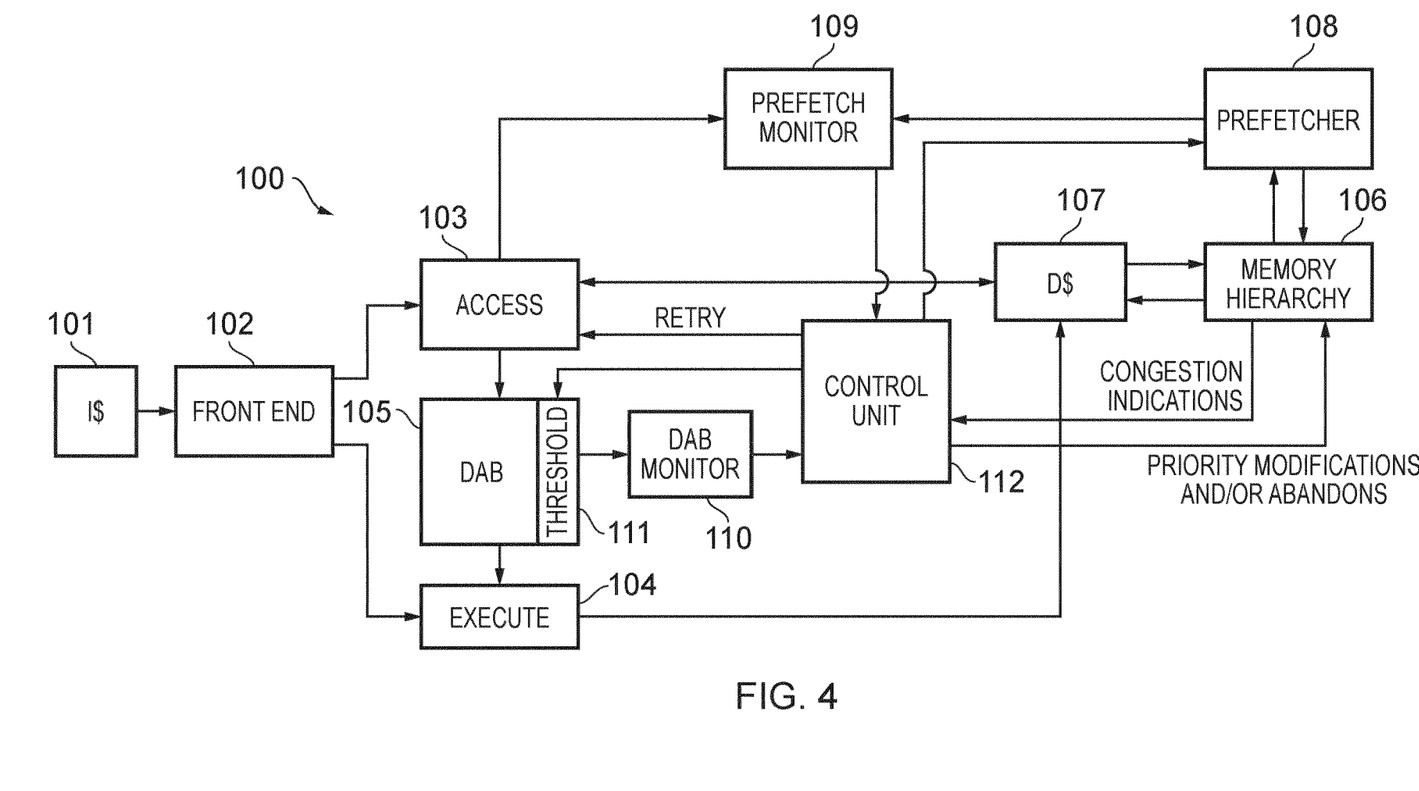
FIG. 4 schematically illustrates an apparatus in some embodiments in which the occupancy of a decoupled access buffer is used as a performance metric.

FIG. 4 schematically illustrates a data processing apparatus 100 in some example embodiments. The apparatus comprises an instruction cache 101, from which instructions in the sequence of instructions to be executed by the apparatus are retrieved via interaction with a memory system (not explicitly shown in FIG. 4). The sequence of instructions are provided to the front end circuitry 102, where the identification of the instructions as "access" instructions or "execute" instructions is carried out. This identification may come from the instructions being explicitly labelled as one type or the other, or alternatively the front end circuitry 102 may also comprise the capability to identify and categorise the instructions on-the-fly, for example as is described in U.S. patent application Ser. No. 16/658,490 and in European patent application 19386043.4. From the front end circuitry 102 the instructions are then issued either to the access portion 103 or to the execute portion 104 of the instruction processing circuitry. Together the access portion 103 and the execute portion 104 form parts of decoupled access-execute circuitry, and the decoupled access-execute circuitry further comprises a decoupled access buffer (DAB) 105, which the access portion 103 populates with entries comprising data items which have been retrieved from memory by the action of its own "access phase" running ahead of the "execute phase" carried out by the execute portion 104. The execute portion 104 can then make use of the data items stored in the DAB 105 in support of its data processing operations. The operations of the access portion 103 cause data items to be retrieved from a memory hierarchy 106 and for data items to be cached in the data cache 107. The prefetcher 108 monitors the memory addresses of the data items requested to be retrieved from the memory hierarchy and seeks to identify patterns therein. The prefetcher 108 extrapolate identified patterns in order to generate prefetch requests and thus to prepopulate the data cache 107 with data items that are expected to be required if that pattern continues. Prefetch monitoring circuitry 109 is also provided, which determines the current performance of the prefetching operations with reference to input from the prefetcher 108 and the access portion 103, in that it determines how accurate the prefetching operations are with respect to the memory addresses which are in fact specified by the access portion 103. For example the prefetch monitor 109 may determine a proportion of prefetches made, which related to memory addresses which were in fact later required to be accessed. In a further example, the prefetch monitor 109 may determine a timeliness metric indicating a proportion of prefetches made, which related to actual requests made by the program that could be fulfilled without significant delays.

The apparatus further comprises a DAB monitor 110 which in particular is arranged to monitor the current occupancy of the DAB 105. The occupancy of the DAB 105 can be used as an indication of the relative success of the decoupled-access execute paradigm, in that when the content of the DAB 105 is greater, the execute portion 104 will generally have a good supply of data items on the basis of which it can make further progress with its data processing operations without stalling. Conversely, when the content of the DAB 105 is lower, the likelihood of the execute portion 104 being held up waiting for a required data item increases. Both the DAB monitor 110 and the prefetch monitor 109 provide input to the control unit 112. This control unit is provided in this embodiment to coordinate control of the DAE processing and the prefetching. The DAB 105 has an associated threshold 111, which is under the control of the control unit 112 and defines the maximum occupancy of the DAB 105 which is currently permitted. In some circumstances the threshold 111 may be effectively absent (e.g. set to the physical size of the DAB 105 or higher), allowing the access portion 103 to add as much content to the DAB 105 as it can physically hold. However, on the basis of the information it receives, the control unit 112 can adjust the capacity threshold 111 of the DAB 105 and/or change the aggressiveness (and/or distance) of the prefetcher 108. For example, the control unit 112 is arranged to reduce the capacity threshold 111 of the DAB 105 (and hence the degree of DAE decoupling) when the prefetching is currently accurate and to increase the capacity threshold 111 of the DAB 105 (and hence to the degree of DAE decoupling) when the prefetching is less accurate.

The control unit 112 is also arranged to receive congestion indications from the memory hierarchy 106. These congestion indications may be indicative of congestion relating to memory devices themselves, to one or more interconnects, or to other memory control devices which generally form part of the memory hierarchy 106. For example, such an indication may take the form of a "negative acknowledgement" (NACK). When one or more congestion indications are received from the memory hierarchy 106, the control unit 112 can respond by modifying the control of the apparatus to seek to alleviate that congestion. One mechanism by which the control unit 112 can do this is to throttle back the prefetching through appropriate signalling to the prefetcher 108 and thus reduce the rate at which prefetch requests are issued into the memory hierarchy 106. Another mechanism at the disposal of control unit 112 is to modify the priority of requests which are currently pending within the memory hierarchy. The control unit 112 can thus issue priority modification messages into the memory hierarchy, for example to reduce the priority of an existing request in order to seek to alleviate the congestion. The control unit 112 can also issue messages to cause cause prefetch requests to be abandoned entirely. Pending memory access requests generated by the access portion 103 can also be caused to be lowered in priority by this mechanism. Indeed pending memory access requests generated by the access portion 103 can be caused to be abandoned by this mechanism of the control unit 112, but this additionally will trigger a retry signal to be sent from the control unit 112 to the access portion 103 relating to the abandoned memory access request, since (unlike prefetch requests) these memory access requests form a necessary part of the data processing operations being carried out and cannot simply be abandoned. In response to a retry signal relating to an abandoned memory access request, the access portion 103 will cause the memory access request to be reissued. This may be essentially without delay, or may in some circumstances be reissued later, in dependence on the current processing requirements. The control unit 112 can also make use of the above-described priority modifications/abandonments in response to the performance metrics of either of the DAE processing or the prefetching. For example when a performance metric for the prefetcher 108 is sufficiently high (good prefetching), the control unit 112 can issue a control signal to cause at least one memory access request issued by the access portion 103 to be lowered in priority. Indeed such memory access requests issued by the access portion 103 could also be abandoned, though this further requires the retry signal to cause them to be reissued. Similarly, when a performance metric for the DAE processing is sufficiently high, e.g. the current occupancy of the DAB 105 is above a certain level, the control unit 112 can issue a control signal to cause at least one prefetch request issued by the prefetcher 108 to be lowered in priority or abandoned.

Figure 5:
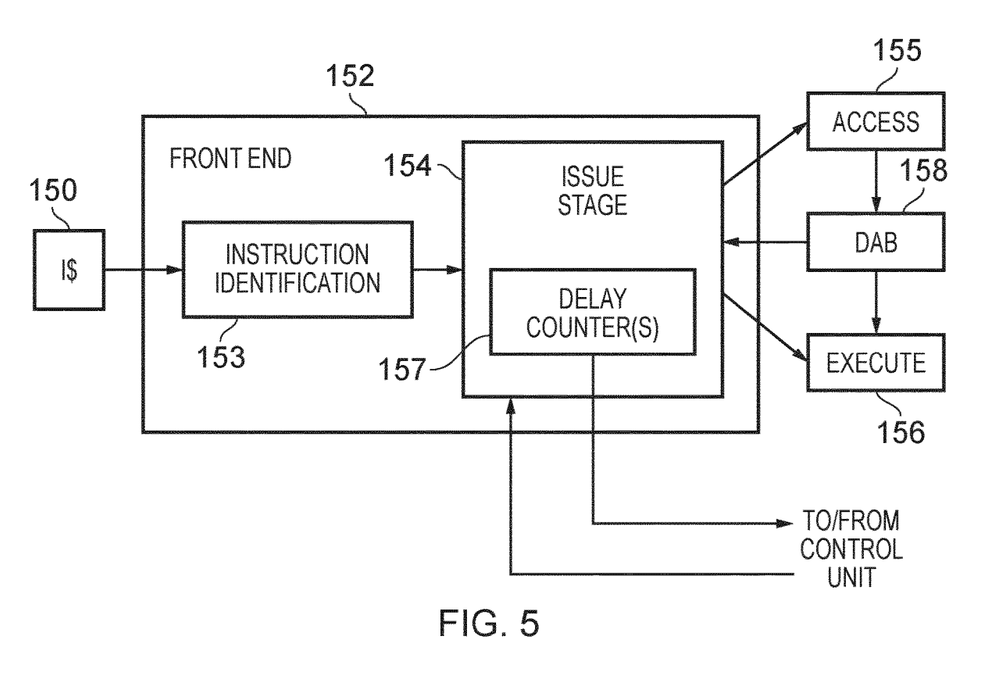
FIG. 5 schematically illustrates an apparatus in some embodiments in which at least one delay counter in an issue stage is used as a performance metric.

FIG. 5 schematically illustrates in more detail front end circuitry 152 which, in the manner of the example shown in FIG. 4, receives a sequence of instructions retrieved from an instruction cache 150 (which may therefore be the instruction cache 101 of the example of FIG. 4). Within the front end circuitry 152 instruction identification is first carried out with a respect to each instruction received from the instruction identification circuitry 153. As mentioned above, this could take the form of simply reading the labelling of the instructions, or may involve on-the-fly identification of the instruction type. Thus identified, the instructions are then passed to the issue stage 154 of the front end circuitry 152. From the issue stage 154 the instructions are then either issued to the access portion 155 or the execute portion 156 of the decoupled access processing circuitry. The decoupled access processing circuitry also comprises a decoupled access buffer (DAB) 158, which in the manner described above is used by the access portion 155 to store data items retrieved from memory and required by the execute portion 156. The issue stage 154 further comprises delay counters 157 which are arranged to track how long an instruction is held in the instruction stage before being issued to either the access portion 155 or the execute portion 156. Information from the delay counters 157 can be passed to a control unit such as the control unit 112 of the example embodiments shown in FIG. 4 and may form an indication of the performance of the access portion. For example, when the DAE processing is operating well only small delays may be encountered at the issue stage. Conversely, the control unit can also control the issue stage 154 by modifying an issue rate at which the load related instructions are allowed to be dispatched for execute by the access portion thus effectively "slowing down" the access portion, i.e. reducing the extent to which the access phase of the DAE processing runs ahead of the execute phase. This may for example be in response to the observation of the performance of the prefetcher in the system.

Figure 6:
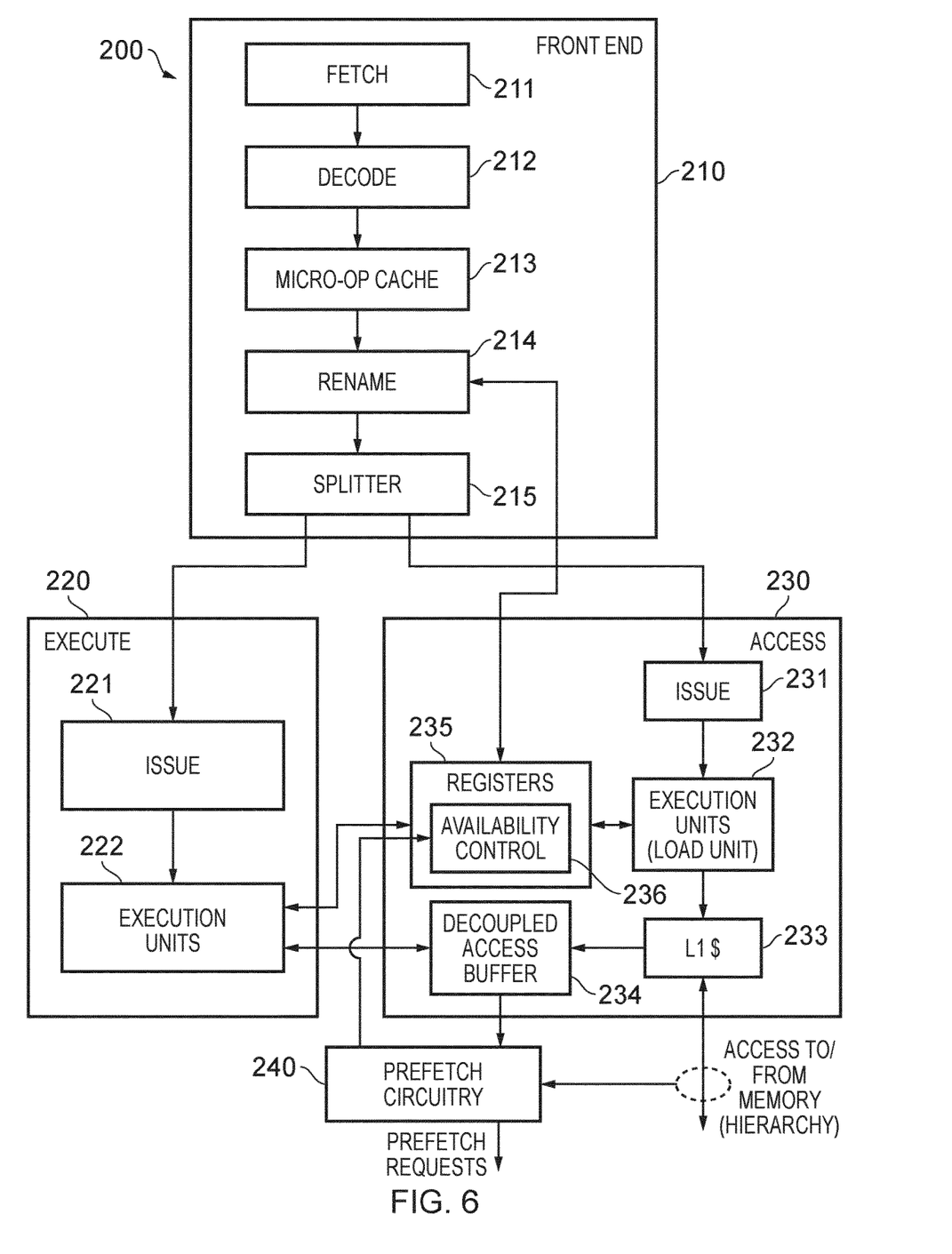
FIG. 6 schematically illustrates an apparatus according to some embodiments in which control over the operation of the access portion of decoupled access-execute processing circuitry is exerted by means of the availability of registers for renaming.

FIG. 6 schematically illustrates a data processing apparatus 200 in accordance with some embodiments. Generally the apparatus 200 comprises front end circuitry 210, execute circuitry 220, access circuitry 230, and prefetch circuitry 240. The front end circuitry 210 is schematically shown to comprise a sequence of stages, namely fetch 211, decode 212, micro-op cache 213, rename 214, and splitter 215. Thus, the sequence of instructions which are fetched by the operation of the fetch stage 211 are decoded in the decode stage 212 and decoded instructions (either whole or subdivided into micro-ops) may be cached in the micro-op cache 213. The rename stage 214 performs renaming operations with respect to the architectural registers specified in the instructions to map these onto available physical registers, such that out-of-order instruction execution can be performed. Note that in this DAE processing system this out-of-order instruction execution may comprise not only out-of-order operation in the sense that the access portion can run ahead of the execute portion, but may comprise out-of-order execution within the respective execute 220 and access 230 portions themselves. The splitter 215 then directs the instructions identified as "access" instructions to the access circuitry 230, whilst other instructions are directed to the execute circuitry 220. The execute circuitry 220 comprises issue circuitry 221 and execution units 222. Load-related instructions which are directed from the splitter 215 to the access portion 230 are received by the issue stage 231 which then issues the instructions to the execution units 232. Execution units 232 (in particular one or more load units thereof) will cause data items to be retrieved from the memory hierarchy and brought into the L1 data cache 233. Such "access" data items are also caused to be temporarily stored in the decoupled access buffer 234, to which the execution units 222 of the execute portion 220 have access. Prefetch circuitry 240 monitors the pattern of memory addresses accessed by the access portion 230 and generates prefetch requests which also cause data to be brought into the L1 cache 233, seeking to avoid the latency associated with data retrieval from memory. The execution units 222 and 232 also interact with the physical registers 235 in the access portion 230. It is these physical registers which the rename stage 214 of the front end circuitry 210 allocates in its renaming activities. Note that the access portion 230 also comprises register availability control 236, which forms part of the registers 235 and determines the number of registers which are available for renaming. This thus provides a further mechanism by which the run-ahead distance of the access phase with respect to the execute phase can be controlled. Fewer physical registers available for renaming will limit the run-ahead distance and vice versa. Note also that in FIG. 6 an output (performance metric) of the prefetch circuitry 240 provides an input to the availability control 236, such that the operation of the decoupled access-execute part of the circuitry can be controlled at least in part in dependence on the performance of the prefetch circuitry.

Figure 7:
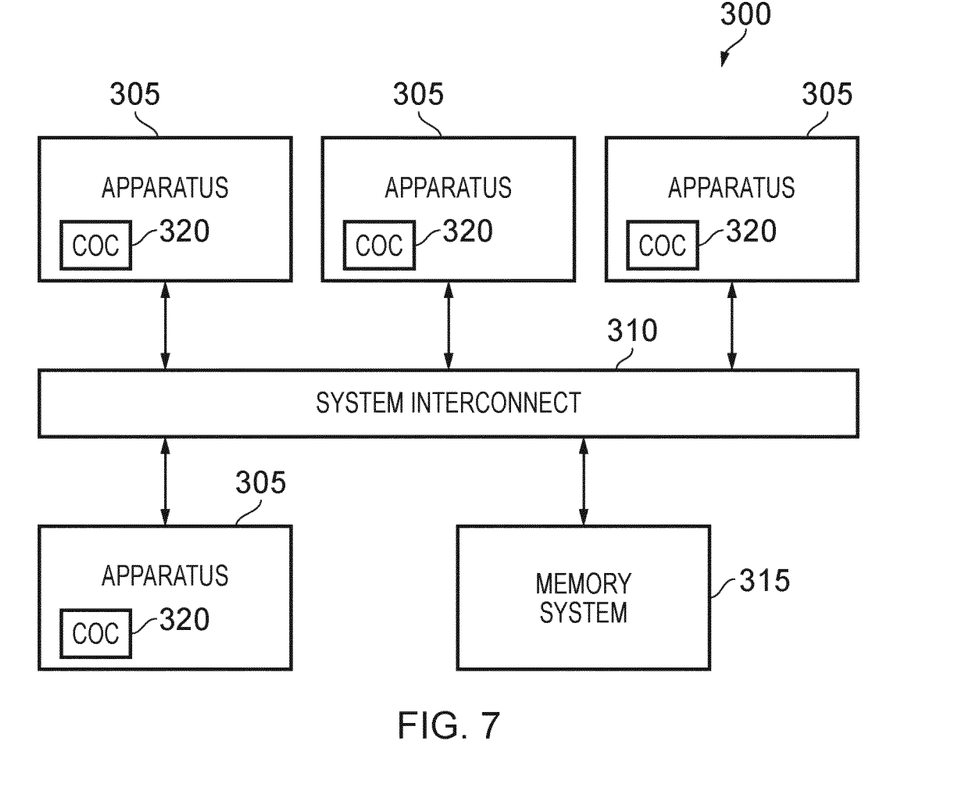
FIG. 7 schematically illustrates a data processing system in some embodiments.

FIG. 7 schematically illustrates a data processing system 300 comprising multiple apparatuses 305 which may be configured in accordance with any of the above-described embodiments. These apparatuses 305 are connected via a system interconnect 310, which also provides each of them with access to a memory system 315. Thus for example with reference to the example shown in FIG. 4, congestion indications received from the memory hierarchy or from the interconnect itself by any of the apparatuses 305 can be used as the basis for modification of the prefetch operations carried out by that apparatus and/or its decoupled access execute operations. Further, in this multiple apparatus system the multiple apparatuses 305 each comprise coordinated operation control (COC) units 320, which are arranged to signal to one another via the system interconnect 310, and allow each apparatus to control its DAE processing and/or prefetching in coordination with the other apparatuses of the system, such that system-defined metrics for fairness and quality-of-service can be met.

In brief overall summary apparatuses and methods are provided, relating to the control of data processing in devices which comprise both decoupled access-execute processing circuitry and prefetch circuitry. Control of the access portion of the decoupled access-execute processing circuitry may be dependent on a performance metric of the prefetch circuitry. Alternatively or in addition, control of the prefetch circuitry may be dependent on a performance metric of the access portion.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Apparatus comprising:
instruction fetch circuitry to retrieve a sequence of instructions;
instruction processing circuitry comprising decoupled access-execute processing circuitry comprising an access portion and an execute portion, wherein the access portion is arranged to execute load-related instructions of the sequence of instructions and to cause data items to be retrieved from memory as a result of the load-related instructions to be locally stored for access by the execute portion,
and the execute portion is arranged to execute data processing instructions of the sequence of instructions comprising accessing locally stored operands of the data processing instructions;
and memory access circuitry comprising:
a data cache for temporary storage of data items retrieved from memory by the instruction processing circuitry;
prefetch circuitry responsive to an identified pattern of data retrieval by the instruction processing circuitry to extrapolate the identified pattern and cause data items from predicted addresses to be retrieved from memory and stored in the data cache based on the extrapolated pattern,
wherein the apparatus is arranged to carry out at least one of:
control of the access portion in dependence on a performance metric of the prefetch circuitry; and
control of the prefetch circuitry in dependence on a performance metric of the access portion.

2. The apparatus as claimed in claim 1, wherein the instruction processing circuitry further comprises a decoupled access buffer and the access portion is arranged to cause the data items retrieved from memory as a result of the load-related instructions to be stored in the decoupled access buffer,
and the execute portion is arranged to execute the data processing instructions of the sequence of instructions comprising accessing the operands of the data processing instructions stored in the decoupled access buffer.

3. The apparatus as claimed in claim 1, wherein the apparatus is responsive to the performance metric of the prefetching circuitry meeting a prefetching accuracy threshold to reduce an extent to which the access portion executes the load-related instructions of the sequence of instructions in advance of the execute portion executing the data processing instructions of the sequence of instructions.

4. The apparatus as claimed in claim 1, wherein the apparatus is responsive to the performance metric of the prefetching circuitry not meeting a prefetching accuracy threshold to increase an extent to which the access portion executes the load-related instructions of the sequence of instructions in advance of the execute portion executing the data processing instructions of the sequence of instructions.

5. The apparatus as claimed in claim 1, wherein the apparatus is responsive to the performance metric of the access portion meeting a decoupled access-execute processing performance threshold to reduce an extent to which the prefetch circuitry causes data items to be retrieved from memory and stored in the data cache based on the extrapolated pattern.

6. The apparatus as claimed in claim 1, wherein the apparatus is responsive to the performance metric of the access portion not meeting a decoupled access-execute processing performance threshold to increase an extent to which the prefetch circuitry causes data items to be retrieved from memory and stored in the data cache based on the extrapolated pattern.

7. The apparatus as claimed in claim 4, wherein the performance metric of the access portion comprises a current occupancy of the decoupled access buffer and the decoupled access-execute processing performance threshold comprises a defined occupancy level of the decoupled access buffer.

8. The apparatus as claimed in claim 4, further comprising an issue stage comprising at least one delay counter, wherein each delay counter is arranged to measure a period for which a data processing instruction of the sequence of instructions is held at the issue stage pending its operands being available in the decoupled access buffer, and wherein the performance metric of the access portion comprises the period measured by the at least one delay counter.

9. The apparatus as claimed in claim 1, further comprising register renaming circuitry to perform register renaming operations to support out-of-order execution of the load-related instructions of the sequence of instructions by the access portion,
and wherein the apparatus is arranged to carry out the control of the access portion by modification of a number of access registers which can be renamed by the register renaming operations.

10. The apparatus as claimed in claim 2, wherein the apparatus is arranged to carry out the control of the access portion by modification of a maximum usable capacity of the decoupled access buffer.

11. The apparatus as claimed in claim 1, wherein the apparatus is arranged to carry out the control of the access portion by modification of an issue rate at which the load-related instructions of the sequence of instructions are dispatched for execution by the access portion.

12. The apparatus as claimed in claim 1, wherein the apparatus is arranged to carry out the at least one of:
the control of the access portion in dependence on a performance metric of the prefetch circuitry; and
control of the prefetch circuitry in dependence on a performance metric of the access portion, subject to a hysteresis function applied to the performance metric.

13. The apparatus as claimed in claim 1, wherein the memory access circuitry is arranged to receive an access congestion indication from a memory system and/or an interconnect,
and the apparatus is responsive to receipt of the congestion indication to reduce an extent to which the access portion executes the load-related instructions of the sequence of instructions in advance of the execute portion executing the data processing instructions of the sequence of instructions.

14. The apparatus as claimed in claim 13, wherein the apparatus further responsive to the receipt of the congestion indication to reduce an extent to which the prefetch circuitry causes data items to be retrieved from memory and stored in the data cache based on the extrapolated pattern.

15. The apparatus as claimed in claim 1, wherein the apparatus is responsive to the performance metric of the access portion meeting a decoupled access-execute processing performance threshold to cause the memory access circuitry to issue a control signal to cause at least one prefetch request already issued by the prefetch circuitry to be lowered in priority and/or abandoned.

16. The apparatus as claimed in claim 1, wherein the apparatus is responsive to the performance metric of the prefetching circuitry meeting a prefetching accuracy threshold to cause the memory access circuitry to issue a control signal to cause at least one access request issued by the access portion to retrieve at least one data item from memory to be lowered in priority.

17. The apparatus as claimed in claim 1, wherein the apparatus is responsive to the performance metric of the prefetching circuitry meeting a prefetching accuracy threshold to cause the memory access circuitry to issue a control signal to cause at least one access request issued by the access portion to retrieve at least one data item from memory to be abandoned and to issue a retry signal to the access portion to cause the access portion to re-issue the at least one access request.

18. A system comprising plural apparatuses according to claim 12, wherein the system is responsive to receipt of the congestion indication to coordinate the control of the access portion and/or the control of the prefetch circuitry of each apparatus in dependence on at least one of:
 a system fairness rule; and
 a quality-of-service metric for at least one of the plural apparatuses.

19. The system as claimed in claim 18, wherein the system is responsive to the performance metric of the access portion meeting a decoupled access-execute processing performance threshold to cause the memory access circuitry to issue a control signal to cause at least one prefetch request already issued by the prefetch circuitry to be lowered in priority and/or abandoned.

20. A method of data processing comprising:
 retrieving a sequence of instructions for execution by decoupled access-execute processing circuitry comprising an access portion, an execute portion, and a decoupled access buffer;
 executing load-related instructions of the sequence of instructions in the access portion;
 storing data items retrieved from memory as a result of the load-related instructions in the decoupled access buffer;
 executing data processing instructions of the sequence of instructions in the execute portion comprising accessing operands of the data processing instructions stored in the decoupled access buffer;
 storing data items retrieved from memory in a data cache;
 using prefetch circuitry to identify a pattern of data retrieval from memory and to extrapolate the identified pattern;
 using the prefetch circuitry to retrieve data items from predicted addresses in memory and stored in the data cache based on the extrapolated pattern; and carrying out at least one of:
  control of the access portion in dependence on a performance metric of the prefetch circuitry; and
  control of the prefetch circuitry in dependence on a performance metric of the access portion.

\* \* \* \* \*